(12) United States Patent
Davies et al.

(10) Patent No.: US 6,853,634 B1
(45) Date of Patent: Feb. 8, 2005

(54) ANONYMITY IN A PRESENCE MANAGEMENT SYSTEM

(75) Inventors: Elwyn B Davies, Ely (GB); Andrew Newton Harker, Bishop's Stortford (GB); David Robert Stringer, Knebworth (GB); Eric W Parsons, Ashton (CA); Steven M Armstrong, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/461,654

(22) Filed: Dec. 14, 1999

(51) Int. Cl.[7] .................................................. H04J 3/24

(52) U.S. Cl. ..................... 370/349; 370/352; 370/389; 379/211.02

(58) Field of Search ................................ 370/349, 244, 370/389, 355, 352, 410, 353, 356, 392, 252, 522, 142, 259, 217, 215, 218, 395, 52; 709/207, 204; 455/422, 410, 414.1, 425, 445, 463, 462, 419, 557, 186.1; 379/33, 211.02, 201, 201.02, 265; 358/434

(56) References Cited

U.S. PATENT DOCUMENTS

| | | | | |
|---|---|---|---|---|
| 5,946,386 | A | * 8/1999 | Rogers et al. | ............... 379/265 |
| 6,006,253 | A | * 12/1999 | Kumar et al. | ................ 709/204 |
| 6,167,432 | A | * 12/2000 | Jiang | .......................... 709/204 |
| 6,226,668 | B1 | * 5/2001 | Silverman | ................... 709/204 |
| 6,246,670 | B1 | * 6/2001 | Karlsson et al. | ............ 370/244 |
| 6,247,043 | B1 | * 6/2001 | Bates et al. | .................. 709/200 |
| 6,301,609 | B1 | * 10/2001 | Aravamudan et al. | ...... 709/207 |
| 6,370,233 | B1 | * 4/2002 | Bennett, III et al. | ........... 379/37 |
| 6,510,461 | B1 | * 1/2003 | Nielsen | ....................... 709/224 |

OTHER PUBLICATIONS

XP–002,173,451, J. Rosenberg et al., Nov. 1998, "SIP for Presence", p. 12–last paragraph, p. 13–program.*
XP–002173451. J Rosenberg. "SIP for Presence". Nov. 13, 1998. Internet Draft. (http://www.alternic.org/drafts/drafts–r–s/draft–rosenberg–sip–pip–00.txt).
XP–002173449. G Appenzeller. "The Mobile People Architecture". Jan. 1999. Computer Systems Laboratory, Stanford University. Jan. 1999. (http://mpa.stanford.edu/publications/CSL–TR–99–777.ps).
XP–002173450. Calsyn & Dusseault. "Presence Information Protocol Requirements", Internet Draft. Feb. 9, 1998. (http://www.alternic.org/drafts/drafts–d–e–/draft–dusseault–pipr–00.txt).
XP–002173452. A D Joseph. "The Case for Services Over Cascaded Networks". International Conference on Wireless and Mobile Multimedia 1998. Oct. 30, 1998. (http://iceberg.cs.berkeley. edu/papers/Joseph–WoWMoM98.ps).
12 pages downloaded from http//:www.icq.com on Aug. 11, 1999.

(List continued on next page.)

*Primary Examiner*—Edward F. Urban
*Assistant Examiner*—C. Chow
(74) *Attorney, Agent, or Firm*—Mintz, Levin, Cohn, Ferris, Glovsky & Popeo, P.C.

(57) ABSTRACT

A presence management system allows connections between watching parties and watched parties in a multiple access communications network to be managed. When the presence management system receives a contact request from a watching party it determines whether the required watched party is available for contact. The system then provides information about this to the watching party who made the request. The presence management system chooses the best mode of communication (e.g. email or fax) taking into account the watched parties preferences and details about the facilities available to the watching party.

22 Claims, 6 Drawing Sheets

OTHER PUBLICATIONS 4 pages downloaded from http://messenger.msn.co on Aug. 11, 1999.

3 pages downloaded from http://www.generalmagic.com on Aug. 11, 1999.

6 pages downloaded from http://www.wildfire.com on Aug. 11, 1999.

7 pages downloaded from http://www.oz.com/pulse/ Aug. 1999.

2 pages downloaded from http://lucent.com on Apr. 6, 2000 comprising a press release date Jun. 9, 1999.

An 11 page copy of "Nortel's Technology Perspective" Monday Oct. 19, 1998.

One page photocopy of a newspaper article. Financial Times Jun. 9, 1999.

* cited by examiner

ANONYMITY IN A PRESENCE MANAGEMENT SYSTEM

BACKGROUND OF THE INVENTION

1. Field of the Invention

This invention relates to a presence management system for use in a multiple access communications network.

2. Description of the Prior Art

Telecommunication users of today are faced with ever increasing choice over how they communicate. A typical user has several different kinds of communications terminal such as mobile telephones, fax machines, personal computers, lap-top computers. Also a typical user also often has more that one of a given type of communications terminal, for example, more than on E-mail account, or home and work telephone numbers. This produces complexity and confusion both for senders and receivers of communications.

Receivers of communications have to work hard to field all incoming communications and such users often find that interruptions from alerts, such as telephone calls and instant messages, are intrusive.

Typically, receivers of communications have little control over what communications are received, at which times, and in which modes. In face to face communications, humans are able to control the degree of interaction which they allow with particular people or groups. However, with today's communication networks the degree and resolution of the control of electronically mediated communications is much less. For example, telephone numbers are often fully public (in a directory) and are typically issued on demand to others who explicitly ask and know the full address. Also, a telephone number, once released to others, has continuing validity unless the telephone number is changed at great inconvenience and expense. Similar problems apply for email addresses. This means that it is easy for others, such as salesmen or nuisance callers to contact you more times than desired. In order to prevent this problem, telephone numbers and email addresses may be withheld but this gives the disadvantage of isolating the "owner" of the telephone number or email address.

Senders of communications also experience problems because they are often unsure about which mode of communication to use at a given time for a particular destination. In order to determine the most appropriate method of access there are many factors to be considered. These include factors to do with the sender such as what they are trying to communicate and factors to do with the receiver such as where the intended recipient is and what they are doing at the time.

Two examples of instant messaging services are now described:

Microsoft Network (MSN) Messenger Service

MSN messenger service is an instant messaging service for use on the Internet. Users are able to identify when others are online and to send and receive instant messages. By identifying when others are online it is possible to send an instant message to other online individuals or to communicate with several other online individuals at once. In this way the communication and messages are more "real time" than conventional email for example, where an email message may simply remain in an individual's email inbox for some time before it is accessed. The service enables a user to identify when another party in an internet conversation is typing at their computer terminal keyboard. That is, using the instant message service it is possible to "talk" to more than one person at a time in a similar way to an online chat session. The user is also able to control which other parties are able to identify or "see" when the user is online and also to control who is able to send messages to the user. In this respect the MSN service differs from conventional online chat programs. Automatic notification of receipt of messages is provided. However, instant messages in MSN messenger service have a temporary quality. Unless the user deliberately saves these messages they are lost when the message service is shut down. This contrasts with conventional email messages in most email systems which remain until a user actively deletes them. Information about MSN messenger service is provided on the Internet at http://messenger.msn.com.

ICQ ("I seek you")

ICQ is an instant messaging service for internet users. It is a program that enables users to identify others who are online and which alerts users when specified individuals log onto the ICQ service. This removes the need for a directory search to be made each time a user wants to communicate with a specific person.

Using ICQ, messages, files and web pages can be sent to other online users of ICQ in real time and ICQ also supports chat, voice, message board, data conferencing and internet games. When a new user installs ICQ the user is prompted to register at a server which is connected to a broad network of other servers spanning the internet. In the registration process the user receives a unique ICQ identifier number and is able to enter personal information. When the registered user logs onto the Internet the ICQ system detects this and allows other ICQ users to recognise that that user has logged on. The registered user is able to compile a list of friends and associates (these friends and associates must also be registered with ICQ or a compatible instant messaging service) and the ICQ system determines when these individuals are logged onto the internet. Alerting messages are sent to the user to inform him or her when members of the list of friends and associates sign on or off the ICQ system. Users are also able to control who contacts them and to hide their presence on the internet when this is required. Information about ICQ is given on the Internet at http://www.icq.com.

Some instant messaging services include so called "buddy lists" which are lists of other users of that instant messaging service which have been selected by an individual user as being those of interest. The individual user is then informed whether or not the members of the "buddy list" are currently using and available for contact via the instant messaging service. Such buddy lists are essentially attributes of the owning user and do not have any autonomous status in the instant messaging system, thus playing only a passive role therein.

Other instant messaging systems such as America On-line's Instant Messenger (trade mark) offer broadly similar capabilities to ICQ.

Known instant messaging systems such as MSN and ICQ do not deal with multiple access communications networks and are based on the internet only. This is disadvantageous because the functions of the instant messaging systems are only available via the internet.

Unified messaging systems are known, such as Nortel Network's own product CALL PILOT (trade mark). This enables fax, email and voice mail messages to be received via a single "in box" and users are able to set up filters to allow only certain messages to reach them. For example, users are able to listen to textual email messages converted automatically into speech using their mobile telephone and are able to filter out non-urgent messages. However, this is not a presence management system and does not monitor the activity of users on a communications network.

Products are available which act as communications network based "secretaries" to take a user's calls. For example, WILDFIRE (trade mark) produced by Wildfire communications, Inc and PORTICO (trade mark) produced by General Magic, Inc. The WILDFIRE product uses speech recognition to help users manager their phone, fax and email communications. This product dials outgoing calls, announces callers using a voice recording that is played back, records contact details and is able to route incoming calls to any telephone specified by a user. However, this system is not a presence management system because it does not obtain and manage information about the activities of users and monitor their "presence" on the communications network. Also, it is not an instant messaging system and does not enable users who are trying to contact another user to obtain information about the best mode and time to do this. Details about the WILDFIRE product are available on the Internet at www.wildfire.com. Details about PORTICO are available on the Internet at www.generalmagic.com. PORTICO is similar to WILDFIRE and is limited in the same respects as PORTICO.

It is accordingly an object of the present invention to provide a presence management system which overcomes or at least mitigates one or more of the problems noted above.

SUMMARY OF THE INVENTION

According to the present invention there is provided a presence management system suitable for use in a multiple access communications network by watching parties and watched parties, said presence management system comprising:

(i) an input arranged to access a store of watched party information;

(ii) information about connection criteria;

(iii) an input arranged to receive information about events that occur in said multiple access communications network in use; and (iv) an input arranged to receive connection requests from watchers in use; and wherein said presence management system is arranged such that, in use, on receipt of a request from a watching party for a connection with a watched party, a connection address for that watched party is provided under controlled conditions, said conditions being determined on the basis of said watched party information, said information about connection criteria and said input information about events.

A corresponding computer program stored on a computer readable medium is provided, said computer program being adapted to control a presence management system, said presence management system being suitable for use in a multiple access communications network by watched parties and watching parties, said computer program being arranged to control said presence management system such that:

(i) a store of watched party information is accessed;

(ii) information about connection criteria is accessed;

(iii) information about events that occur in said multiple access communications network is received in use via an input; and (iv) connection requests are received from watchers in use; and on receipt of a request from a watching party for a connection with a watched party, a connection address for that watched party is provided under controlled conditions, said conditions being determined on the basis of said watched party information, said information about connection criteria and said input information about events.

A corresponding multiple access communications network is provided comprising a presence management system, said presence management system being for use by watching parties and watched parties, said presence management system comprising:

(i) An input arranged to access a store of watched party information;

(ii) information about connection criteria;

(iii) an input arranged to receive information about events that occur in said multiple access communications network in use; and (iv) an input arranged to receive connection requests from watchers in use; and wherein said presence management system is arranged such that, in use, on receipt of a request from a watching party for a connection with a watched party, a connection address for that watched party is provided under controlled conditions, said conditions being determined on the basis of said watched party information, said information about connection criteria and said input information about events.

A corresponding method of operating a presence management system suitable for use in a multiple access communications network is provided, said presence management system being for use by watching parties and watched parties, at least one of said parties being an automated service, said method comprising the steps of:

(i) accessing a store of watched party information;

(ii) accessing information about connection criteria;

(iii) receiving information about events that occur in said multiple access communications network; and (iv) on receipt of a request from a watching party for a connection with a watched party, a connection address for that watched party is provided under controlled conditions, said conditions being determined on the basis of said watched party information, said information about connection criteria and said input information about events.

This provides the advantage that a presence management system provides a connection address for a watched party under controlled conditions, thus enabling the watched party to control access to that connection address by making use of the presence management system. In one example, the connection address provided is valid only for a limited number of connections or for a limited time. In this way, connection addresses can be issued to watching parties such as sales people whilst at the same time limiting the ability of that watching party to contact the watched party. In another example, the connection address provided is used by the presence management system to forward the connection request direct to the watched party. This prevents the watching party from gaining access to the watched party's direct address.

Further benefits and advantages of the invention will become apparent from a consideration of the following detailed description given with reference to the accompanying drawings, which specify and show preferred embodiments of the invention.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

The term "multiple access communications network" is used to refer to a communications network which comprises several different types of communications network and which can be accessed using a plurality of different types of terminal which also comprise part of the communications network. The communications network can be accessed by a plurality of such terminals at any one time. For example, a public switched telephone network that is connected to a mobile telephone network is a multiple access communications network. This is because the overall network is made up of two different types of communications network and the overall network can be accessed using many different types of terminal such as a conventional telephone handset, a facsimile machine, a mobile telephone or a modem. A multiple access communications network can be thought of as a "federated" network and the component communications networks within a multiple access communications network can be connection-less networks (e.g. the Internet) or connection oriented networks (e.g. public switched telephone networks).

The term "access communications network" is used to refer to a communications network which is situated on the edge or periphery of a core communications network and through which users gain access to the core communications network.

The term "presence management system" is used to refer to an automated system for use in a communications network which provides a single point of presence for a user of that communications network. A point of presence is a source of information about whether a user is available for contact on a communications network, where that user is located on the network, and in which mode that user should preferably be contacted in. A presence management system provides a single point of presence despite the fact that a user has more than one terminal for accessing the communications network in different modes and possibly by different access communications networks. A presence management system also provides context information rather than just raw presence information. Raw presence information is unprocessed information about the availability, location and capability of a user on the communications network. A presence management system processes raw presence information according to rules or other pre-specified criteria about users in order to provide context information that is simpler and easier for human operators to understand.

Figure 1:
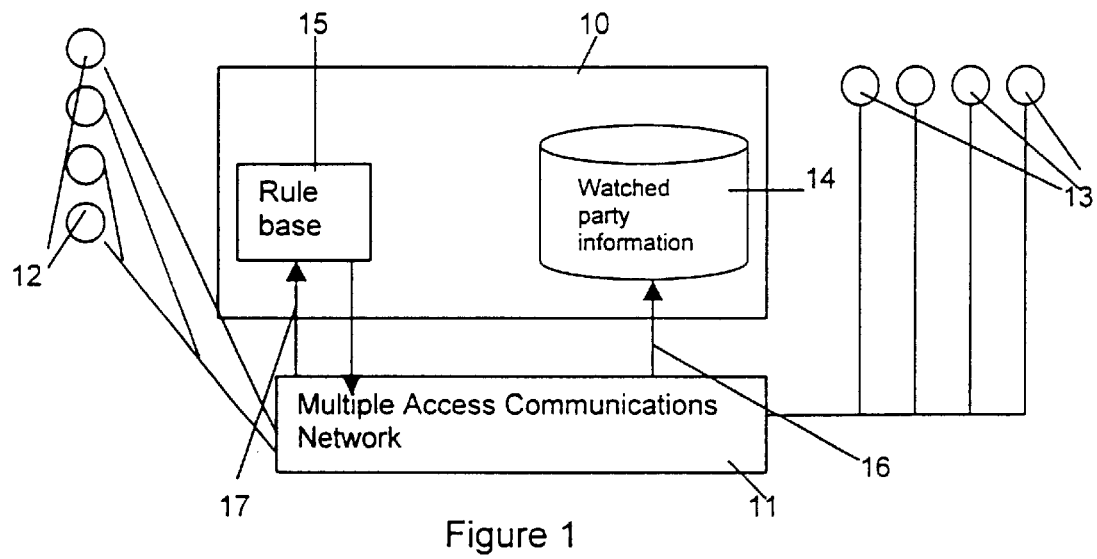
FIG. 1 is a schematic diagram of a presence management system.

FIG. 1 illustrates a presence management system 10 which is connected to a multiple access communications network 11. Also connected to the multiple access communications network 11 are a plurality of watching parties 12 and a plurality of watched parties 13. In FIG. 1, each watching party 12 and each watched party 13 is shown as having a single connection to the multiple access communications network 11. However, this is not necessarily the case. For example, a watched party 13 can be an individual who has access to the multiple access communications network via a mobile telephone, a lap-top computer and via two different personal computers. Similarly, a watching party may have more than one connection to the multiple access communications network.

Each watched party 13 registers with the presence management system 10 and is given a unique presence management identifier. During the registration process each watched party 13 enters personal information which is recorded in a store 14 in the presence management system 10. For example, this information includes the watched party's email address, telephone number, and other contact details. Context information is also included, such as information about whether the watched party is a home worker or a travelling salesman. Details about the watched party's preferences are also recorded, such as which modes of communication are preferred at which times, for example, email messages may be permitted at any time, whilst telephone calls may only be preferred during work hours. Some of this information is stored in the form of rules 15 within the presence management system. Some rules may be default rules that are preconfigured and others are entered by watched parties. However, it is not essential to store this information in the form of rules 15. Any suitable form for the information may be used.

A first input 16 is provided to the presence management system 10 from the multiple access communications network 11. This input 16 is termed an events input and may be provided in the form of an events gateway (described in more detail below). Via this first input 16 information about events that occur in the multiple access communications network are provided to the presence management system 10. In this way events that are associated with the watched parties 13, for example, the event of a watched party logging onto the Internet, are accessed by the presence management system 10. Other examples of events include movement of a watched party between cells of a cellular communications network, remote login events, or keyboard presses by a watched party on an Internet terminal.

If a watching party 12 requires to contact a watched party a contact request is sent to the presence management system 10 by the watching party 12. The contact request reaches the presence management system via a second input 17 which is termed a connection request input. These requests may be received via protocols such as ICQ, IMPP (Instant messaging and presence protocol(s)), or WAP (Wireless Access Protocol, trade mark). In order to make this request the watching party does not need to know any of the watched party's direct contact details; the presence management system identifier for the watched party is used.

A watching party 12 is also able to make a notification request in respect of a watched party and, optionally, a specific event. In this case the watching party 12 is requesting to be notified when a particular type of event occurs rather than requesting to establish contact with a watched party. When users enter their preference details to the presence management system, these may include notification preferences. That is, preferences about when, how and under what circumstances notifications should be provided or accepted.

When the presence management system receives a contact request it determines whether the required watched party is available for contact and provides information about this to the watching party who made the request. For example, the presence management system may respond by providing a particular contact detail for the watched party such as a telephone number. In doing this, the presence management system chooses the best mode of communication (e.g. cellular phone, email or fax) after taking into account the watched parties preferences as explained by the rules and identity of the watching party. Alternatively, the presence management system may inform the watching party that the watched party is unavailable.

The watching party is able to set up a monitor by which the presence management system informs the watching party once the watched party becomes available. That is, the presence management system is arranged such that when a change of state of a watched party occurs, notifications about that change of state are sent to watching parties who have lodged an interest in that watched party.

In determining whether the required watched party is available for contact, the presence management system uses the stored information 14 about the watched party, information about the required connection (e.g. size and type) and also the rules 15. In addition, information about events from the multiple access network 11 is used. For example, a request to send an instant message at 10 pm may be made. If the watched party is online but has configured rules 15 such that no instant messages should be accepted after 9 pm then the presence management system refuses the request. However, the watched party may have set preferences to allow family members to send instant messages at any time. In this case, the request could be granted.

The presence management system allows watching parties to send messages and communications to watched parties even when those watched parties are not "present" or available on the communications network. For example, when a watched party is not logged onto the internet he or she may allow the presence management system to forward email messages and faxes. In this respect the presence management system differs from an instant messaging system.

Services

One or more watched parties 13 may be services and similarly one or more watching parties 12 may be services. For example, as shown in FIG. 2a watching party may be a conference call service 20.

The term "service" is used to refer to an automated service which is operable without human intervention. For example, a computerised cinema ticket service. By allowing watching parties or watched parties to be such services it is possible for users of a presence management system to be notified of conditions or availability of goods or services without the intervention of a human operator.

Figure 2:
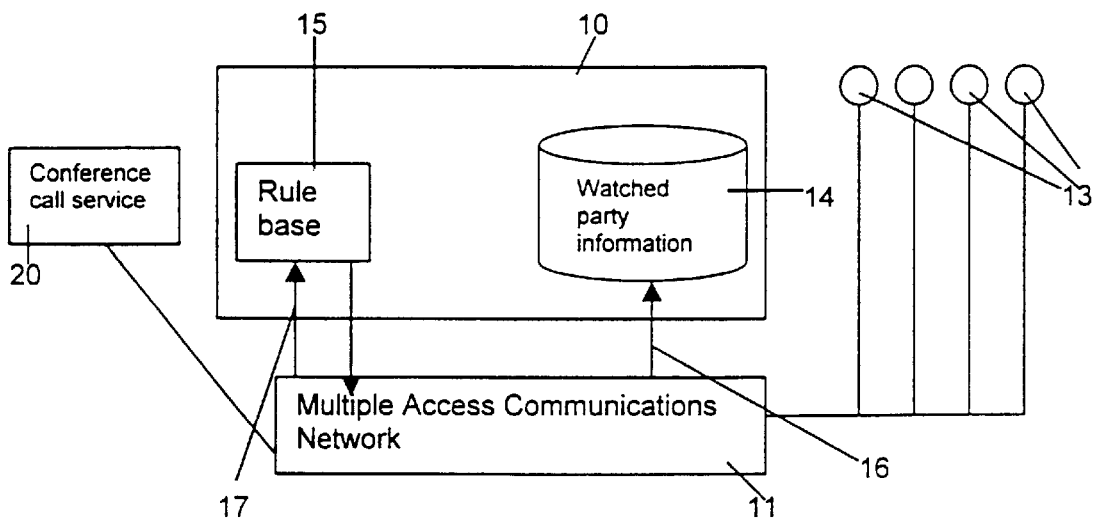
FIG. 2 is a schematic diagram of the presence management system of FIG. 1 with a conference call service as a watching party.

Referring to FIG. 2, the conference call service 20 is able to send connection requests to the presence management system in the same way that any other watching party 12 may, as described above. If the conference call service is required to set up a conference call between three or more watched parties 13, it subscribes with the presence management system 10 in order to be notified when changes in the state of the required watched parties occur. The presence management system 10 will then inform the watching party, which in this case is a conference call service 20, when each required watched party 13 becomes available. In this way the conference call service 20 is able to set up a conference call once each required watched party is available.

However, the information about availability from the presence management system is effectively "real time" so that if a change in state of a watched party occurs just after the conference call is attempted, then that party may not join the conference call. In one example, the conference call service may advantageously form the required watched parties into a group or aggregate as described in more detail below. Then, once notifications of availability are given for a certain number of group members, or a quorum of group members, the conference call is attempted.

The watched parties 13 may record preferences and rules about services such as conference call services 20 and these will be taken into account by the presence management system 10 when it responds to requests from a conference call service 20. Similarly, for other services that are watching parties 12, watched party preferences, information and rules are taken into account.

Figure 3:
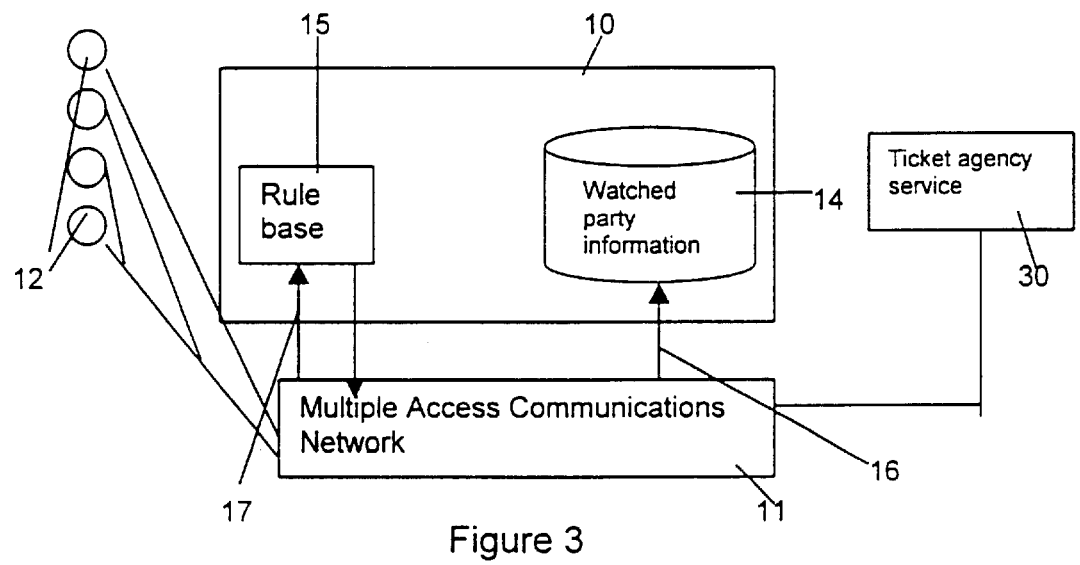
FIG. 3 is a schematic diagram of the presence management system of FIG. 1 with a ticket agency service as a watched party.

It is also possible for a watched party to be a service. For example, FIG. 3 illustrates a ticket agency service 30 which is a watched party. As for any other watched party 13, a watched party that is a service is able to store information 14, and rules 15 in the presence management system 10 and to register with the system 10. Watching parties may send connect or notification requests to the presence management system 10 in respect of the ticket agency service. The notification requests contain additional information as well a simple request to be notified of a change of state in the ticket agency service. For example, the notification request could be a request to be notified about a particular type of concert ticket. Many such notification requests by different watching parties 12 may be made of the presence management system 10. Then, once tickets for the particular concert become available, the ticket agency service 30 provides information about this to the presence management system. This information is provided to the presence management system by virtue of an agreement between the ticket agency service provider and the presence management system provider. As such the event of the tickets becoming available is an example of a "partially interpreted event trigger" as described in more detail below. The presence management system is then able to send notifications to each of the interested watching parties to inform them that the tickets are available.

Other examples of services that may be watched parties include news services, sports scoring services, and share dealing services. Any suitable type of service such as those where members or subscribers require to be informed of changes may be a watched party.

Other examples of services that may be watching parties include security services and fraud detection services. Another example is a service which informs a user of the nearest available car parking. This could use information about geographical location of watched parties from the presence management system. Any suitable type of service such as those where it is required to gain information about activities and communication states of watched parties may be a watching party. Other examples include sales contact services which initiate contacts when watched parties are available and expected to be most receptive.

Aggregates

Figure 4:
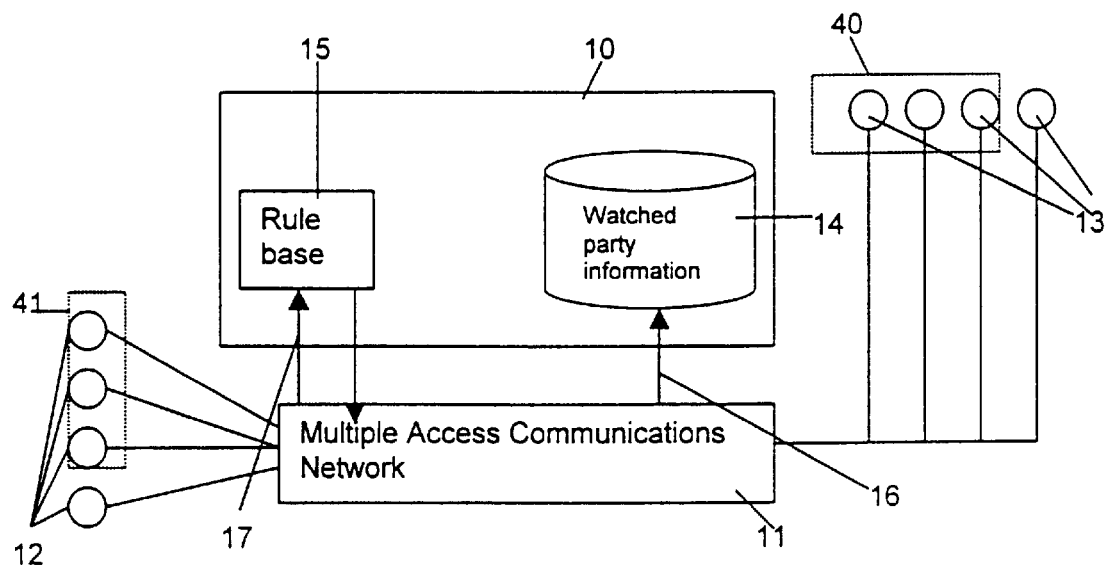
FIG. 4 is a schematic diagram of the presence management system of FIG. 1 with an aggregate of watching parties and an aggregate of watched parties.

It is also possible for a watched party to be an aggregate or group of watched parties. Similarly a watching party may be an aggregate of watching parties. For example, FIG. 4 shows a situation with an aggregate of watched parties 40 and an aggregate of watching parties 41. A group of watched parties may advantageously be formed for many reasons. For example, several watched parties with a common interest such as friends may form an aggregate in order that watching parties can monitor the presence of the group of friends as a whole. This could be useful to arrange meetings between the members of the group of friends. In another example, an association of building contractors in a certain geographical region might form an aggregate of watched parties in order that they might be easily contactable as a group rather than individually. A further example involves a sales department which have several operators taking calls (which may be telephone calls, email messages or any other suitable type of call). An aggregate of operators is formed in order that watching parties who request a contact with the aggregate are allocated to the first available operator with the relevant communication means. In another example, a workflow application requires a purchase requisition to be signed by two out of a group of five authorised signatories. By using an aggregate for the authorised signatories the request for approval is directed to the most appropriate pair of signatories taking into account factors such as presence of the signatories in the office and current activity of the signatories. There are also many similar reasons why a group of watching parties may be formed.

Aggregates differ from "Buddy lists" in several respects. (Buddy lists are described in the Prior Art section above.) Aggregates have an autonomous status from the "point of view" of the presence management system 10 and are able to take actions on their own behalf whereas this is not the case for Buddy Lists. By creating aggregates which have an autonomous status it is possible to enable aggregates to be used in any ways in which watched parties or watching parties can be used. However, Buddy lists are only used for a limited function which is pre-specified.

In order to control membership and existence of an aggregate each aggregate may be allocated an owner. This owner may be a member of the aggregate but this is not essential and only the owner is able to modify or destroy the aggregate. In this way membership and existence of the aggregate are controlled. However, other control mechanisms can also be used which do not involve an owner who is a watching party or a watched party. For example, a rule base within the presence management system could perform this function.

Aggregates may be formed by individual watching parties or watched parties contacting others and forming a group. Alternatively, aggregates may be formed dynamically by an application or service, for example, for a specific task. In the case of the conference call service discussed above, this service could form an aggregate of all the watched parties (or conferencees) who are required members of the conference call. The conference call service monitors the status of the aggregate until say, 80% of the aggregate members are available for a conference call. The conference call is then set up, starting with the owner of the aggregate (for example). Once the call is set-up the aggregate is either destroyed or persists until the call is finished so that late comers can be joined to the ongoing call.

An aggregate is able to interact with the presence management system 10 in the same way as either a watched party 13 or a watching party 12 as described above except that a "quorum" condition is used. For example, when a watched party is an aggregate, when should the presence management system indicate to watching parties that there has been a change of state in the aggregate? Should this be when 50% of the members of the aggregate have changed state or only when all members have changed state? This issue is addressed by setting a threshold level or "quorum" condition as to the number of aggregate members required to change state before the aggregate as a whole is deemed to have changed state. Similarly, when a watching party is an aggregate, a "quorum" condition may be used to determine factors to do with the requests made by the watching party. For example, when should a request be made and what should the request be? A watched party or a watching party may be a member of more than one aggregate.

Anonymity

In another example, the presence management system 10 is arranged to provide a connection address for the watched party. This connection address may either be a direct address for that watched party or an indirect or forwarding address. This enables the anonymity of watched parties to be managed in particular situations. For example, the address may be given to the watching party or alternatively may be used by the presence management system 10 to forward a connection request from the watching party to the watched party. In this latter case, the watching party does not find out what the connection address for the watched party is.

This gives four possibilities. The presence management system 10 can provide a direct connection address to the watching party. For example, this may be desired for family members and others that are specified by the watched party. In the second case, the presence management system 10 can provide an indirect connection address to the watched party. In this situation, the watched party sends communications to a forwarding address such as a P.O. Box or similar entity and that entity forwards the communications to the watched party. This means that the watching party does not gain access to the watched party's direct connection address. In a third case, the presence management system 10 itself forwards communications from the watching party direct to the watched party. Again, in this case, the watching party does not gain access to the watched party's direct connection address. Finally, in the fourth case, the presence management system 10 forwards communications from the watching party to a forwarding address such as a P.O. Box or similar entity. Again the watching party does not gain access to the watched party's direct connection address but also, the presence management system 10 itself does not "know" this direct address.

The watched party is able to store criteria 14 and rules 15 in the presence management system 10 which are used to determine the manner and type of connection address that is provided.

In one example, the presence management system provides an indirect connection address to the watching party that is only operable for a limited number of operations. This provides the advantage that the watched party is able to receive calls from, say, sales people, but is able to limit the number of times that the sales person is able to make contact. In this way, the watched party is able to control the degree of interaction with particular watched parties. Similarly, the presence management system can be arranged to forward connection requests from a watching party only for a certain limited period of time. It is also possible to use a combination of these two situations, by providing an indirect connection address to the watching party that is only operable for a limited number of operations within a limited time period. For example, a connection address for use up to four times within one week could be issued.

In another example, the presence management system provides an indirect connection address to the watching party that is valid only for a limited number of calls or connection attempts. Further criteria can be used, such as limiting validity to a certain number of successful calls or by terminating validity if an unsuccessful call attempt is made. Also, the presence management system can be arranged to forward connection requests from a watching party only for a certain limited number of calls or connection attempts.

Partially Interpreted Event Triggers

The capabilities of the presence management system 10 are extended by using so called "partially interpreted event triggers". These comprise non-communication related events that are provided from a third party service and which occur outside the multiple access communications network. Information about these events is provided to the presence management system 10 via the events input or gateway 16.

Figure 8:
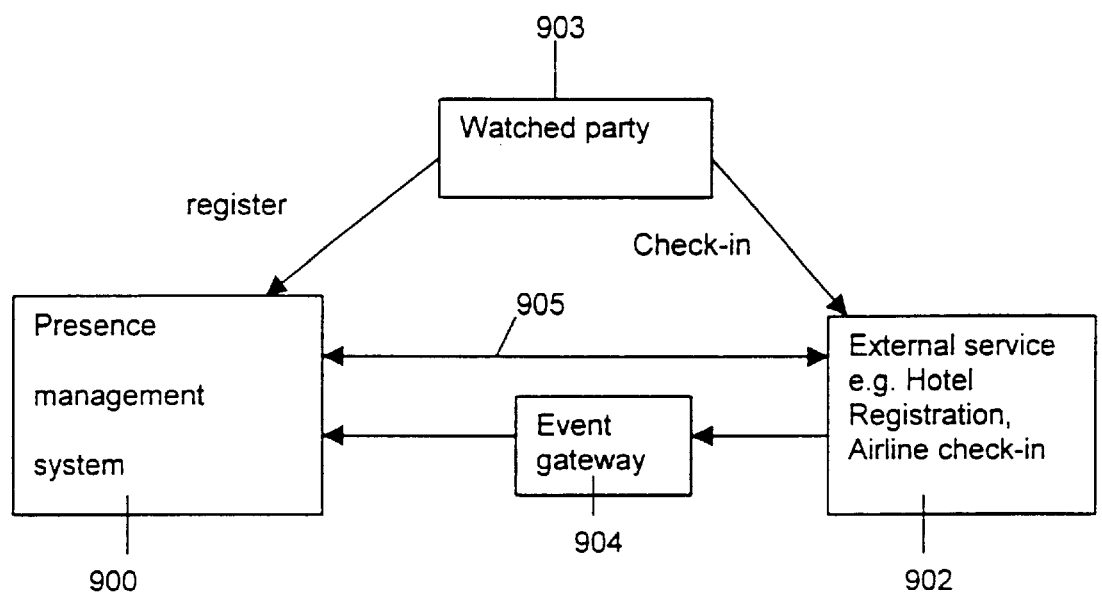
FIG. 8 is a schematic diagram illustrating the use of "partially interpreted event triggers".

FIG. 8 is a schematic diagram illustrating the use of partially interpreted event triggers. A third party service 902 such as a hotel registration system or an airline check-in system is provided and the operator of this system 902 enters into a business relationship 905 with the provider of a presence management system 900. A watched party 903 subscribes to the presence management system 900 in the manner described above in order to benefit from the presence management system service. When this watched party 903 checks into a hotel using the hotel registration service 902, then by virtue of the prior agreement 905 between the hotel registration service 902 and the presence management system 900, information about the check-in event is provided to the presence management system 900. The check-in event is referred to as a "partially interpreted event trigger" and is provided to the presence management system 900 via an event gateway 904 in a multiple access communications network (not shown).

When the watched party 903 subscribes to the presence management system 900, the watched party 903 is able to specify whether check-in events from the third party hotel registration (or other) service should be made available to the presence management system. Alternatively, the watched party, on using the external service 902, is able to specify whether or not partially interpreted event triggers from that service 902 should be supplied to the presence management system.

The external service 902 itself may involve human input and non-automated aspects, however, the part of the external service 902 which provides the partially interpreted event triggers to the event gateway 904 is automated.

Partially interpreted event trigger information is extremely useful because it is up-to-date and accurate. Responses to watching party requests are then improved as a result of using the partially interpreted event trigger information. The use of partially interpreted event triggers in this way adds to the richness and precision of the information provided by the presence management system 10. The presence management system effectively models the presence of watched parties with respect to the multiple access communications network and the partially interpreted event trigger information.

One problem is that if the presence management system gives incorrect responses to watching parties, the consequences are often severe. For example, if a business contract fails because of failed communication between the parties then a user's trust in the presence management system is quickly damaged. This typically leads users to stop using the presence management system. Because of this care is taken to reduce errors and incorrect responses and use of partially interpreted event triggers is one way in which this is achieved. Without partially interpreted event triggers, the information provided by a presence management system 10 must be conservative in its specifications in order to avoid rejection of the presence management system by users.

Examples of external services which may provide partially interpreted event triggers include: security badge swipe systems, hotel registration systems, airline check-in systems and calling card systems. The term "partially interpreted" is used to refer to the fact that more information is available from partially interpreted events than just geographical location information. That is, context information is gained, associated with different types of events. For example, an airline check-in event at a particular airport generally means not only that the user is geographically at the location of the airport but also that the user is about to board a plane (for example). This context information is gained quickly, without the need for the presence management system 10 to determine that the geographical location is in the airport (for example, from the user's mobile telephone location) and then infer that in the context of an airport, the likely outcome is that the user is going to board a plane. The check-in information provides this information quickly and accurately. For example, the presence management system, without the partially interpreted event trigger, may have inferred wrongly that the user was going to board a plane, when in fact they were visiting the airport to collect someone.

More details about the presence management system are now described. The watching parties are also referred to as "watchers" and the watched parties as "individuals" or "entities" or "clients" . Several definitions are now given:
Presence: a quality exhibited by an entity within a network. It consists of location, availability and capability.
Location: some form of spatial co-ordinates for an entity. These may be geographical or more abstract e.g., in terms of network topology. A location may correspond to some addresses.
Availability: the ability of an entity to communicate at given time. In addition to "on-line"/"off-line", status, availability can represent an entity's willingness to engage in communication.
Capability: a measure of forms and capacity of communication an entity can engage in, e.g. due to constraints imposed by the available devices.
Entity: the subject of presence information. An entity may be a person or a service. Also referred to as a watched party or an individual.
Group: a set of entities that is also itself an entity. That is, a group has an exposed presence and may be the subject of a subscription.
Watcher: the target for presence information. A watcher may be a person or a service. A person (or service) may be both an entity and a watcher. Note that different watchers may perceive a different presence for the same entity.

Subscribe: an action of a watcher when it registers an interest in the presence of an entity.

Notify: an action directed at a watcher relating to a change in presence of an entity that was previously the subject of a subscribe.

Presence indicator: an event external to the presence system that is pertinent to an entity's presence Raw presence: an unprocessed collection of presence indicators (which may be related to a single entity).

Context Presence: an abstract state derived from an entity's raw presence according to rules defined for that entity. Not every new presence indicator results in a change to the context presence.

Exposed presence: a view of an entity's (context) presence that is exposed to a watcher. It is derived according to rules defined for that entity. Note that an entity may exhibit a different exposed presence to different audiences.

Audience: a class of potential watchers defined by, or in relation to, an entity. An actual watcher may be part of several audiences for a given entity.

Partial subscribe: a subscribe action that registers interest in part of the presence of an entity. Changes to other parts of that entity's presence will not lead to a notification. Note that, although an entity can be composed of other entities (see Group) it may also have components that are not themselves entities but can still be discussed in terms of their presence.

Micro-subscribe: a subscribe action that is qualified by the watcher to facilitate differentiation by an entity's rules between subscriptions by the same watcher. That is, two different views of presence could be exposed to a watcher, regarding the same entity, related to separate micro-subscriptions.

Communication: an interaction involving more than one participant in which information is transferred. A communication is characterised by the pattern of the interaction and by the media of the information transfer.

Interaction pattern: a message interaction, a conversational interaction or a stream interaction, (in the context of this architecture).

Message interaction: an instant message, a deferred message or an acknowledged message.

Instant message: a message that is delivered to the other participant(s) without explicit action on their part.

Deferred message: a message that is delivered to the other participant(s) only after explicit action on their part, e.g. e-mail and voice-mail.

Acknowledge message: a message that a sender expects to receive from the recipient.

Sender: the initiator of a message interaction.

Conversational interaction: an (interleaved) exchange of messages, e.g. an internet chat session.

Stream interaction: an interaction involving one or more continuous data flows between the participants. Separate flows may go in opposite direction between participants. There may be several distinct flows between the same participants in the same direction. A stream interaction can be classified as simplex, half-duplex or (full) duplex. Note that a 2-way voice call is a stream interaction at the terminal level. The conversational pattern is only imposed in the minds of the (human) participants.

Caller: the initiator of a conversational interaction or a stream interaction.

Media: a form of representation used for transferring information. Possible media are, files (various), text, audio (including speech), fax and video.

Mediation: the action of transforming one kind of communication into another. This may entail a media transformation and/or an interaction pattern transformation.

Mediated communication: a communication that includes a mediation action.

Proxy communication: a communication in which there is an intermediary between the participants.

Third-party communication: a communication that is initiated by a non-participant.

Service discovery: the process by which something becomes aware of the existence of a relevant service.

Service description: a representation of what a service does in a form that is understood by the service provider and by the user of the service.

Service: an entity, e.g. an autonomous software component that can participate in a communication.

Figure 5:
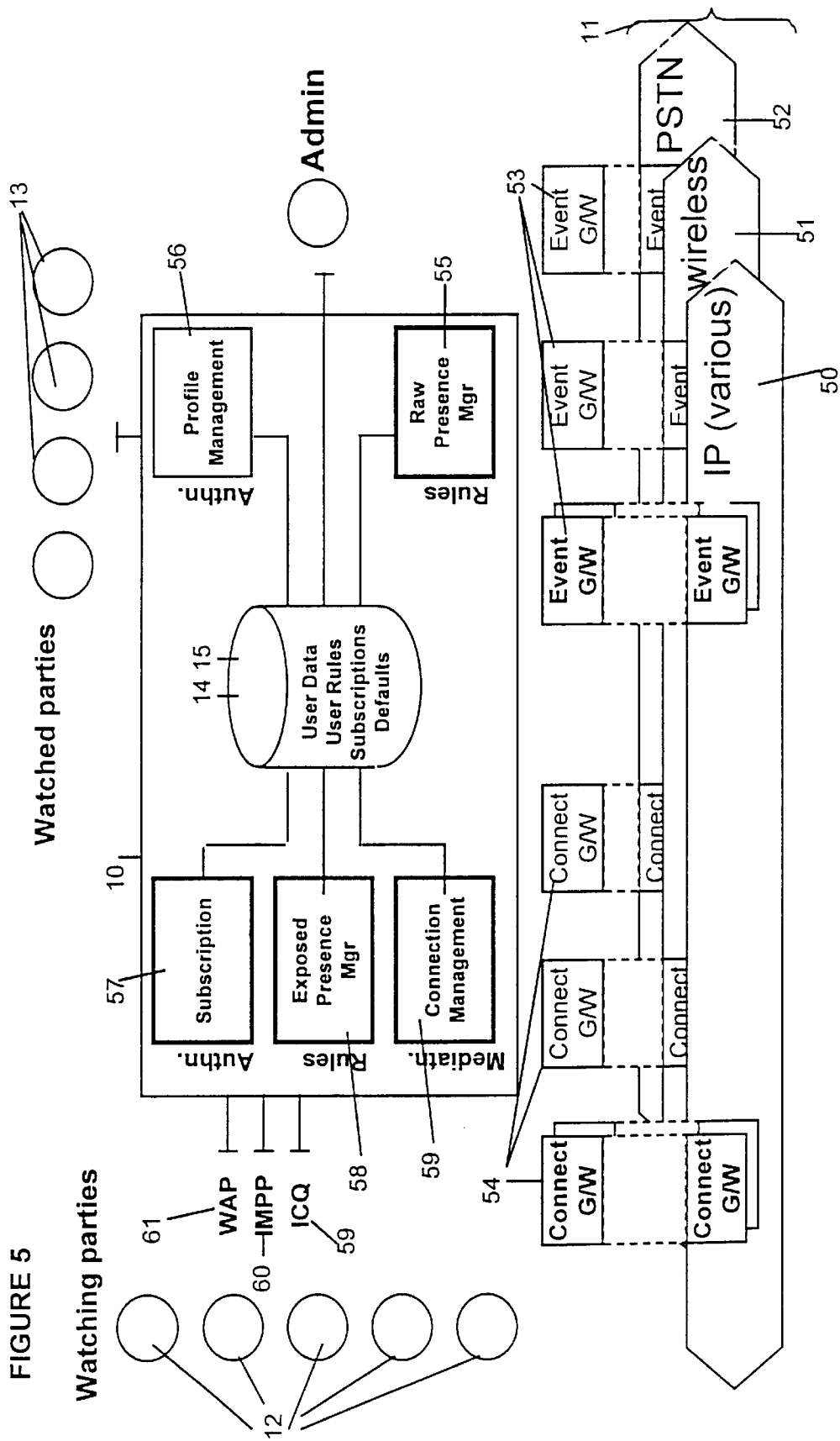
FIG. 5 is a schematic diagram of a presence management system.

FIG. 5 shows the presence management system 10 of FIG. 1 in more detail. Here, a plurality of watchers 12 and a plurality of watched parties 13 have access to the presence management system 10 via a multiple access communications network 11. In this example the multiple access communications network comprises an Internet Protocol communications network 50, a wireless communications network 51, and a public switched telephone network (PSTN) 52. However, this is not essential, different types and combinations of communications networks could be used to form the multiple access communications network.

Inputs from the multiple access communications network 11 to the presence management system 10 are provided in the form of event gateways 53. Also, connection requests, from watchers 12 to the presence management system are accepted via connection request inputs which, for example, may be provided using the IMPP protocol 60, WAP protocol 61 or ICQ protocol 59. Event gateways 53 and are described in more detail below. In the case that the presence management system 10 is used to establish connections between watching parties and watched parties, then a connection from the presence management system to the multiple access communications network 11 is provided in the form of connect gateways 54.

Watched party information 14 and rules 15 are stored in the presence management system 10. When a watched party 13 registers to use the presence management system 10 a profile of that watched party 13 is built up and stored in the presence management system. A profile management system 56 within the presence management system is provided to manage these profiles.

For example, an entity's profile contains the following items which may be entered by the entity or watched party or may be default information that is prespecified:

Contact addresses for that entity on each of a number of access communications networks or component parts of an access communications network.

A set of the possible context presence values for the entity, e.g. "at-home", "at-work", "travelling", "notable-to-contact" or "unknown". For many of these the system also holds attributes, e.g. geographical location.

Minor changes to the default rules for moving from one context presence to another.

The entity's own view of what potential audiences its exposed presence has, e.g. family, friends, colleagues. Members of each potential audience see a different projection of the entity's presence. In application to enterprises, the administrator is able to provide audience definitions common to many entities (cf. E-mail distribution lists).

A watcher authentication level for each audience to allow the entity to have safeguards that a watcher really does belong to an audience.

For some sorts of communication (e.g. instant messages informing of new E-mail) the entity may wish to exercise fine-grained control and insist on the watcher making a micro-subscription. The attributes of such a subscription can also be subject to an entity's rules (cf. E-mail filters)

When an entity is first registered with a presence management system server 10 there is a substantial amount of data capture required. In order that the work-load of the entity is reduced reliance is put on default information and a type of "wizard" is used to help the user enter the required information quickly and easily. Later, the data can be subsequently modified by the watched party or entity. These functions are carried out by the profile management system 56.

For example, in the case of an entity representing a human user the interaction provided by the "wizard" data capture process can be as follows:

The user chooses from a number of life-styles, "office-worker", "travelling-salesman" or "executive". Each life-style being represented by a template with default values.

Each choice leads to a dialog tailored for that choice. For example, to establish the geographical location of the home and of the office. Additional locations are created if appropriate.

In one embodiment, the presence management system is able to detect and capture details about the devices that the entity uses for communicating.

Definitions of potential audiences for the user's presence (family, friends etc.)

Finally, the user will decide which contact information is notified to members of which audiences for what changes in context presence.

Some parts of the configuration are complicated and these are initially masked from the user until they press the "advanced options" button.

The presence management system also contains a raw presence manager 55 which manages an unprocessed collection of presence indicators. The raw presence manager 55 orders the presence indicators into a table or other structure which is indexed by entity. In this way each presence indicated is accessible on the basis of the entity to which it relates. Large volumes of presence indicators can be stored by the raw presence manager 55. However, by their very nature, presence indicators become redundant once more recent presence indicators about a given entity become available and a process for updating presence indicators or giving weights to these indicators on the basis of age is provided.

The multiple access communications network 11 is made up of one or more communications networks, such as a public switched telephone network 52 and a wireless communications network 51. An event gateway, specific to the type of communications network, is provided for each communications network or each technology, such as mobile telephones and copper wire telephones. Note that the Internet is logically a federation of several access networks and a core data network using a common Internet Protocol (IP) substrate.

Event gateways receive raw data from the access networks, pre-process this and pass it onto the raw presence manager via one or more event inputs 16. Examples of these events are keyboard activity on a terminal, movement between cells in a cellular communications network and change of VLR (Visitor Location Register) and off-hook events in a PSTN. Other events include use of the "last offered incoming call" service on a public switched telephone network, details from calendar services and the opening of a Palm Pilot 7 (trade mark) lid. Event gateways produce an authenticated, time ordered series of location data events that have been filtered and homogenised. That is, only information about users being tracked by this presence system is passed to the raw presence manager. This is achieved by using a filter in the event gateway or in the events input 16. Also, events are presented to the raw presence manager in a technology neutral format (all the idiosyncrasies of different access network technology are hidden by the event gateway as far as possible).

An event gateway is divided into two parts. A first part interfaces with the presence management system 10 whilst a second part interfaces with the access network. The two parts of the event gateway communicate using a protocol over an interface. Different types of event gateway are provided according to the type of access network used.

As described above a subscription is made when a watcher registers an interest in the presence of an entity. A subscription manager 57 is provided within the presence management system 10 in order to manage the subscription process.

Users or services (watching parties) outside of the presence management system may subscribe to presence information about particular clients (watched parties) of the presence system. If the presence management system comprises multiple servers this request is routed to the home server for the client (watched party) in question. The subscription request is made over one of a number of protocols: IMPP, WAP or possibly ICQ. In each case the subscription request contains a return address for notifications (e.g. an IMPP address), some identification information for the subscriber or watching party (so that the presence client's propagation restrictions can be obeyed) and the identity of the presence client about whom presence information is sought.

In one example, the lifetime of a subscription is controlled by the subscriber, i.e. the subscriber (watching party) declares when its interest in a given presence client is over. However, if the watching party does not take this action to declare the end of its interest then old subscriptions eventually become garbage. In one case, subscriptions are held persistently (for fault recovery) and this creates an issue of garbage collection. For example, all subscriptions that are inactive for one hour may be deleted.

In the case of Instant Message notification of an awaiting e-mail, for example, the decision on whether the client is "on-line" to a particular e-mail notification may be a function of the sender, the size and possibly of keywords within the subject of the e-mail. Rather than the subscriber presenting this, second order, information at the point of sending the Instant Message, the initial subscription may capture all the information upon which the reachability decision is made. What might have been a single subscription by an e-mail notification service regarding a single client may then be replaced by a set of fine-grained subscriptions each regarding that client's willingness to receive a certain e-mail notification.

In this case, IMPP is extended to carry additional parameters. This may be in the form of an XML string. For example, in the case of an e-mail notification service, the IMPP subscribe also contains <subscription-detail type="IM" reftype="e-mail" from="fred">. One possibility is that the presence system responds to such a subscription by asking for further information. e.g., if the rules asserted by the client cover the "to" field of the e-mail (i.e. who else has/will receive it) then the response is to refuse the subscription giving an appropriate reason.

The presence management system 10 also comprises an exposed presence manager 58 as illustrated in FIG. 5. As described above "exposed presence" is a view of an entity's presence that is exposed to a watcher. It is derived according to rules defined for that entity and in this way, an entity exhibits different exposed presences to different audiences. The function of the exposed presence manager 58 is to "decide" what information to make available to watching parties on the basis of rules 15 and other criteria set by watched parties or defined as defaults.

In the case that there is a change in the information available, for example, because new information arrives via an event gateway 53, then the exposed presence manager 58 is triggered. The exposed presence manager then checks for active subscriptions to the watched party in respect of whom the new information has arrived. If some active subscriptions are present, the exposed presence manager 58 consults the rules 15 and determines what (if any) information to make available to the watching parties who have active subscriptions.

The presence management system 10 may also have an interface 59 to ICQ and/or IMPP 60 or WAP 61 protocol outputs. Information that is made available to watching parties who have active subscriptions can be made via this interface 59 or these outputs.

The presence management system also comprises a connection manager 59 in some examples. In the cases that the presence management system itself forwards communication requests direct to watched parties, the connection manager 59 provides this forwarding facility using connect gateways 54. At least one connect gateway 54 is provided for each type of access network. Part of the function of the connection manager 59 is to "decide" which connect gateway 54 should be used for a particular communication request and to manage changes between connect gateways 54 according to the communication requirements. As well as this the connection manager determines which access media is used for a given interaction in the event that more than one access medium is available and suitable.

In one embodiment the connection manager 59 comprises a mediation component 62. This enables messages in one format e.g. voice to be changed into another format e.g. email, in order to provide flexibility for watched parties and watching parties. The mediation component 62 uses rules to decide whether and how best to change the format of a given message.

The presence management system also comprises a raw presence manager 55. The raw presence manager 55 obtains and stores information from the event gateways 53 and processes this information to form a "context presence" for each watched party. A plurality of default contexts are defined such as "at home", "at work desk", "travelling" and information received from the event gateways 53 together with other watched party information is used to determine which context applies for a given watched party at a particular time. Rules are used to aid this determination process. For example, rules for mapping location indicators onto presence contexts are pre-defined. Watched parties are also able to enter their own rules and presence contexts for use by the raw presence manager 55.

The rules used by the raw presence manager 55 and the exposed presence manager 58 are always locally resolvable. Many of the other components of the presence management system use rules. These may be stored in one rule base or alternatively stored in conjunction with the particular components of the presence management system. For example, the connection manager 59 uses rules to decide which of several possible connection options to prefer.

The interface between the raw presence manager 55 and the exposed presence manager 58 may be distributed. The two managers 55, 58 have different requirements. The raw presence manager 55 makes only local updates to a data store 14 based on its input data. It exhibits a low latency so that location data from event gateways 53 need not be backed up persistently. That is, once processed by the raw presence manager 55 any significant changes are held in the data store 14.

The exposed presence manager 58 has to engage in a number of external interactions, over a variety of protocols to propagate presence information to subscribers. It is either triggered directly from the data store 14, as a reflex to the updates made by the raw presence manager 55 or there is a direct interface between the two.

Figure 6:
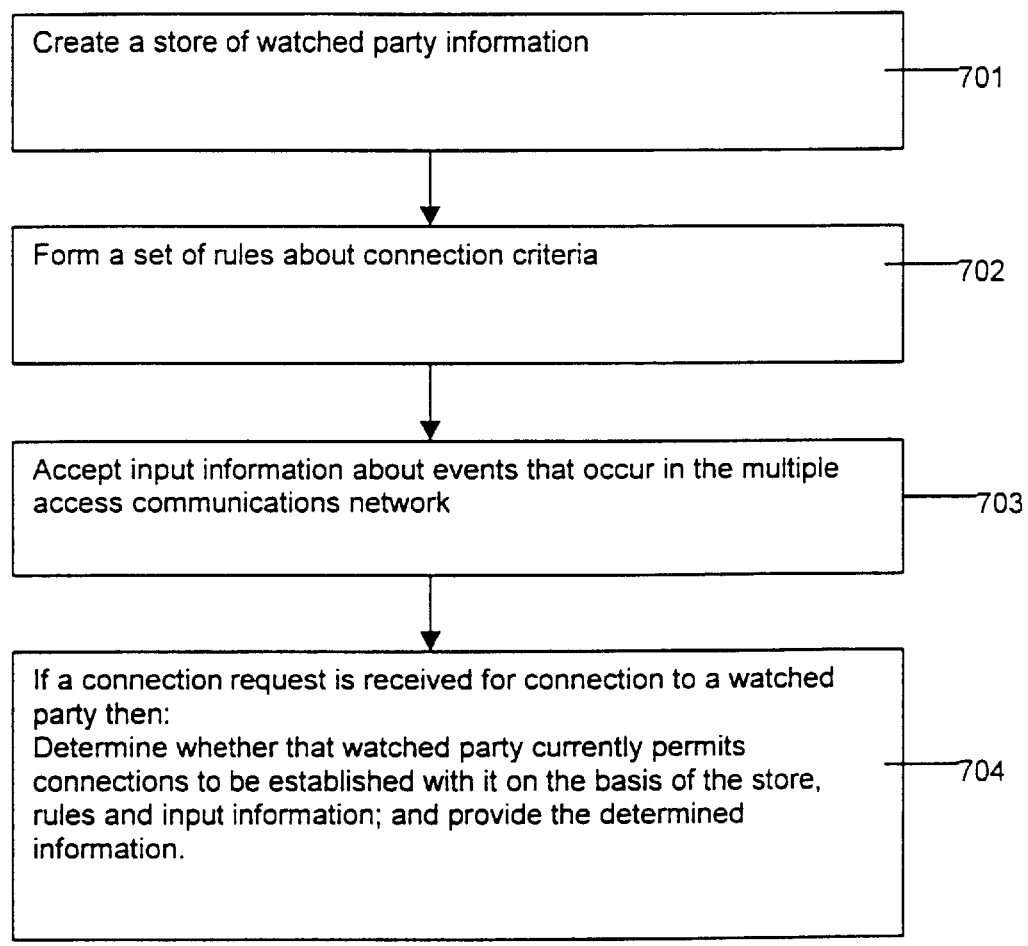
FIG. 6 is a schematic diagram of an event gateway.

In one embodiment a computer program stored on a computer readable medium is provided. FIG. 6 is a flow diagram of the method implemented by the computer program. This computer program is adapted to control a presence management system such that connections are managed between watching parties and watched parties. This presence management system is suitable for use in a multiple access communications network, and said computer program is arranged to control said presence management system such that:

(i) a store of watched party information is created (box 701 of FIG. 6);

(ii) a set of rules about connection criteria are formed (box 702 of FIG. 6);

(iii) information about events that occur in said multiple access communications network is received in use via an input (box 703 of FIG. 6); and (iv) connection requests are received from watchers in use; and on receipt of a request from a watching party for a connection with a watched party, information about whether that watched party currently permits connections to be established with it is provided, said information being determined on the basis of said store, said rules and said input information about events; and wherein at least one party is a service (box 704 of FIG. 6).

Figure 7:
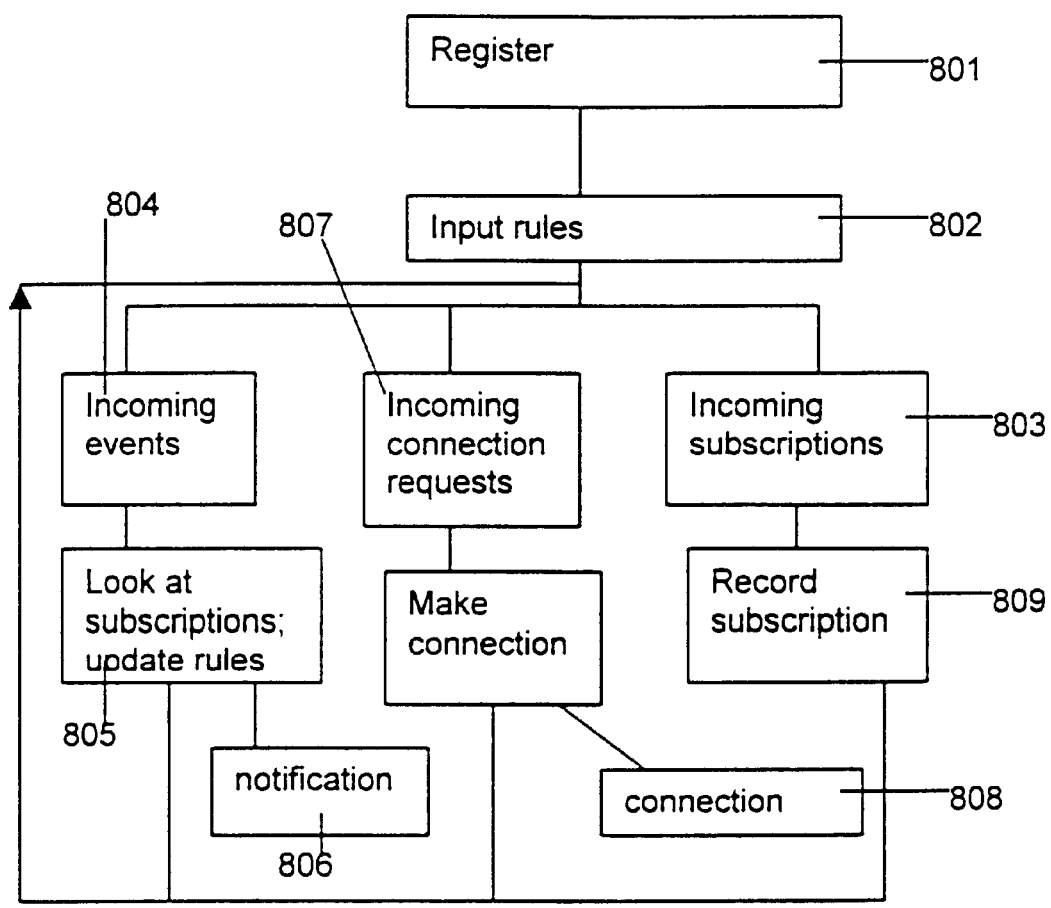
FIG. 7 is a flow diagram for another example of a computer program for controlling a presence management system.

FIG. 7 is a flow diagram of another example of such a method implemented by a computer program. In this case, watched parties first register 801 with a presence management system and input information 802 which is used to form rules. This information is about the watched party's communication criteria and preferences, such as what types of terminal he or she uses and which modes of communication are preferred at different times of the day.

The presence management system may then receive a number of different types of input. For example, a subscription 803 from a watching party may be received, in which case the subscription details are recorded 809. For example, this could be a request by a watching party to be informed about any change of state in a watched party.

The presence management system may also receive an incoming event 804. In this case, the method involves checking 805 all the current subscriptions to see if the incoming event is relevant to any of these. If so, notifications are sent out 806 to the watching parties who made the relevant subscriptions. The record of the subscriptions is then updated 805. For example, a subscription may be arranged to be activated only once and then deleted.

The presence management system may also receive an incoming connection request 807 from a watching party. In this case the presence management system checks the availability of the watched party and if appropriate establishes a connection or forwards the connection request to the watched party 808.

In one example, a presence management system comprises: a first input arranged to receive requests from watching parties in use, each of which may be of one of three types: (a) a notification request being in respect of a watched party and, optionally, a specific event, (b) a contact request in respect of a watched party, or (c) a fetch request in respect of a watched party. The presence management system also has a second input arranged to receive information about events, relating to said watched parties, that occur in said multiple access communications network in use. As well as this a third input is provided, arranged to receive and store information entered by a watched party. This information relates to the said watched party and is used to transform the incoming events and control watching parties in respect of the information that they may receive about the watched party. The information is stored so that it can be associated with the watched party to which it relates. The presence management system has a processor arranged such that in use, when information about an event, relating to a particular watched party is received, the information is transformed in accordance with the information previously received from the watched party. When information about an event relating to a particular watched party is received, any watching parties who made notification requests about that particular watched party are notified. This is done provided that the stored information does not forbid or restrict the transmission of a notification at that time. For example, the watching party may have specified that he or she should not be interrupted between 9 am and 10 am. If a contact request is received, contact is only established by the presence management system if the required terminals are available and if the user preferences of both parties allow contact to be established. If a fetch request is received, part or all of the information relating to a watched party is transmitted to the watching party, according to user preferences and criteria set by the watched party. In this way a watching party can quickly and easily obtain all available information about a watched party.

A range of applications are within the scope of the present invention. These include any presence management systems in which a watched party is able to control who has access to his or her direct contact details and for how long; the watched party can also prevent others from gaining access to his or her direct contact details. The invention also encompasses a computer program for controlling such a presence management system and a multiple access communications network which comprises such a presence management system.

What is claimed is:

1. A presence management system suitable for use in a multiple access communications network by watching parties and watched parties, said presence management system comprising:
   (i) an input arranged to access a store of watched party information;
   (ii) information about connection criteria;
   (iii) an input arranged to receive information about events that occur in said multiple access communications network in use; and
   (iv) an input arranged to receive connection requests from watchers in use; and wherein said presence management system is arranged such that, in use, on receipt of a request from a watching party for a connection with a watched party, a connection address for that watched party is provided under controlled conditions, said connection address being only operable for a limited number of connections, said conditions being determined on the basis of said watched party information, said information about connection criteria and said input information about events.

2. A presence management system as claimed in claim 1 wherein said connection address is only operable for a predetermined time which is determined by the watched party.

3. A presence management system as claimed in claim 1 wherein the request from the watching party is forwarded to the connection address, in such a way that the watching party has no access to that connection address.

4. A presence management system as claimed in claim 1 wherein at least one of the parties is an automated service.

5. A presence management system as claimed in claim 4 wherein said automated service is a watching party.

6. A presence management system as claimed in claim 4 wherein said automated service is a watched party.

7. A presence management system as claimed in claim 1 wherein at least one of said parties comprises a plurality of individuals.

8. A presence management system as claimed in claim 1 wherein said presence management system is further arranged to provide information about a geographical location of a watched party in use, on a basis of said received information about events that occur in said multiple access communications network.

9. A presence management system as claimed in claim 1 wherein said presence management system is further arranged to provide information about current activity of a watched party, on a basis of said received information about events that occur in said multiple access communications network.

10. A presence management system as claimed in claim 1 wherein said presence management system is arranged to provide information about types of connections that a watched party is able to participate in.

11. A presence management system as claimed in claim 1 which further comprises a monitor for monitoring said received information about events and wherein said presence management system is arranged to provide information about a change in availability of a watched party.

12. A presence management system as claimed in claim 1 wherein said store of watched party information comprises watched party connection preferences.

13. A presence management system as claimed in claim 1 and wherein a plurality of said events are initiated by watched parties and comprise a communication via said multiple access network.

14. A presence management system as claimed in claim 1, wherein said connection address is rendered invalid if an unsuccessful call attempt is made.

15. A presence management system as claimed in claim 1, wherein said connection address is only operable for a predetermined number of successful call attempts.

16. A presence management system as claimed in claim 1, wherein said connection address is only operable for a predetermined number of calls within a predetermined time period.

17. A computer program stored on a computer readable medium, said computer program being adapted to control a presence management system, said presence management system being suitable for use in a multiple access communications network by watched parties and watching parties, said computer program being arranged to control said presence management system such that:
- (i) a store of watched party information is accessed;
- (ii) information about connection criteria is accessed;
- (iii) information about events that occur in said multiple access communications network is received in use via an input; and
- (iv) connection requests are received from watchers in use; and on receipt of a request from a watching party for a connection with a watched party, a connection address for that watched party is provided under controlled conditions, said connection address being only operable for a limited number of connections, said conditions being determined on the basis at said watched party information, said information about connection criteria and said input information about events.

18. A multiple access communications network comprising a presence management system, said presence management system being for use by watching parties and watched parties, said presence management system comprising:
- (i) an input arranged to access a store of watched party information;
- (ii) information about connection criteria;
- (iii) an input arranged to receive information about events that occur in said multiple access communications network in use; and
- (iv) an input arranged to receive connection requests from watchers in use; and wherein said presence management system is arranged such that, in use, on receipt of a request from a watching party for a connection with a watched party, a connection address for that watched party is provided under controlled conditions, said connection address being only operable for a limited number of connections, said conditions being determined on the basis of said watched party information, said information about connection criteria and said input information about events.

19. A method of operating a presence management system suitable for use in a multiple access communications network, said presence management system being for use by watching parties and watched parties, at least one of said parties being an automated service, said method comprising the steps of:
- (i) accessing a store of watched party information;
- (ii) accessing information about connection criteria;
- (iii) receiving information about events that occur in said multiple access communications network; and
- (iv) on receipt of a request from a watching party for a connection with a watched party, a connection address for that watched party is provided under controlled conditions, said connection address being only operable for a limited number of connections, said conditions being determined on the basis of said watched party information, said information about connection criteria and said input Information about events.

20. A presence management system suitable for use in a multiple access communications network by watching parties and watched parties, said presence management system comprising:
- (v) an input arranged to access a store of watched party information;
- (vi) information about connection criteria;
- (vii) an input arranged to receive information about events that occur in said multiple access communications network in use; and
- (viii) an input arranged to receive connection requests from watchers in use; and wherein said presence management system is arranged such that, in use, on receipt of a request from a watching party for a connection with a watched party, a connection address for that watched party is provided under controlled conditions, said connection address being only operable for a predetermined number of successful call attempts, said conditions being determined on the basis of said watched party information, said information about connection criteria and said input information about events.

21. A presence management system suitable for use in a multiple access communications network by watching parties and watched parties, said presence management system comprising:
- (ix) an input arranged to access a store of watched party information;
- (x) information about connection criteria;
- (xi) an input arranged to receive information about events that occur in said multiple access communications network in use; and
- (xii) an input arranged to receive connection requests from watchers in use; and wherein said presence management system is arranged such that, in use, on receipt of a request from a watching party for a connection with a watched party, a connection address for that watched party is provided under controlled conditions, said connection address being only operable for a predetermined number of calls within a predetermined time period, said conditions being determined on the basis of said watched party information, said information about connection criteria and said input information about events.

22. A presence management system suitable for use in a multiple access communications network by watching parties and watched parties, said presence management system comprising:
- (i) an input arranged to access a store of watched party information;
- (ii) information about connection criteria;
- (iii) an input arranged to receive information about events that occur in said multiple access communications network in use; and
- (iv) an input arranged to receive connection requests from watchers in use; and wherein said presence management system is arranged such that, in use, on receipt of a request from a watching party for a connection with a watched party, the presence management system acting to forward a communication from the watching party to the watched party to a connection address for that watched party under controlled conditions, said conditions being determined on the basis of said watched party information, said information about connection criteria and said input information about events.

* * * * *